United States Patent [19]
Ohga et al.

[11] Patent Number: 5,259,856
[45] Date of Patent: * Nov. 9, 1993

[54] METHOD OF PRODUCING GLASS PREFORM IN FURNACE FOR HEATING GLASS

[75] Inventors: Yuichi Ohga; Shinji Ishikawa; Hiroo Kanamori; Ichiro Tsuchiya; Hiroshi Yokota, all of Yokohama, Japan

[73] Assignee: Sumitomo Electric Industrial, Ltd., Osaka, Japan

[*] Notice: The portion of the term of this patent subsequent to Apr. 21, 2009 has been disclaimed.

[21] Appl. No.: 891,913

[22] Filed: Jun. 1, 1992

Related U.S. Application Data

[63] Continuation of Ser. No. 714,028, Jun. 12, 1991, abandoned, which is a continuation of Ser. No. 578,293, Sep. 6, 1990, abandoned.

[30] Foreign Application Priority Data

Sep. 6, 1989 [JP] Japan .................................. 1-232378

[51] Int. Cl.⁵ .......................................... C03B 37/014
[52] U.S. Cl. ................................ 65/3.12; 65/DIG. 16; 65/900
[58] Field of Search ...................... 65/3.11, 3.12, 18.1, 65/18.2, 375.15, DIG. 16, 900

[56] References Cited

U.S. PATENT DOCUMENTS

| | | | |
|---|---|---|---|
| 4,539,033 | 9/1985 | Beales et al. | 65/900 |
| 4,707,174 | 11/1987 | Johnson et al. | 65/900 |
| 4,822,399 | 4/1989 | Kanamori et al. | 65/3.12 |
| 4,882,827 | 11/1989 | Kusumi et al. | 65/374.15 X |
| 4,969,941 | 11/1990 | Kyoto et al. | 65/18.1 |
| 4,979,971 | 12/1990 | Kyoto et al. | 65/900 |
| 5,106,401 | 4/1992 | Ishikawa et al. | 65/3.12 |

FOREIGN PATENT DOCUMENTS

| | | |
|---|---|---|
| 0302121 | 2/1989 | European Pat. Off. . |
| 55-15682 | 4/1980 | Japan . |
| 55-67533 | 5/1980 | Japan . |
| 56-28852 | 7/1981 | Japan . |
| 58-42136 | 9/1983 | Japan . |
| 58-58299 | 12/1983 | Japan . |
| 60-86049 | 5/1985 | Japan . |
| 1575299 | 9/1980 | United Kingdom . |

OTHER PUBLICATIONS

Ryozo Yamauchi, "Production of Optical Fiber Perform", The Patent Abstract of Japan, Apr. 1989, vol. 13, No. 158, (C-586) (3506).

*Primary Examiner*—Robert L. Lindsay
*Attorney, Agent, or Firm*—Cushman, Darby & Cushman

[57] ABSTRACT

A heating furnace for heating a porous preform made of fine particles of quartz base glass for an optical fiber which comprises a heater and a muffle tube positioned inside the heater to separate a heating atmosphere from the heater, wherein the muffle tube body consists of highly pure carbon and an inner wall and an outer wall of the body is coated with a carbon material selected from the group consisting of pyrolytic graphite and solid-phase carbonized glassy carbon.

6 Claims, 4 Drawing Sheets

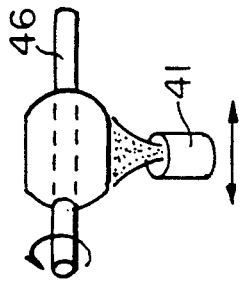
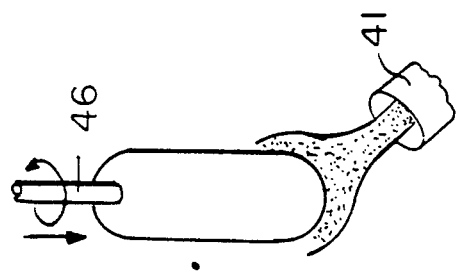
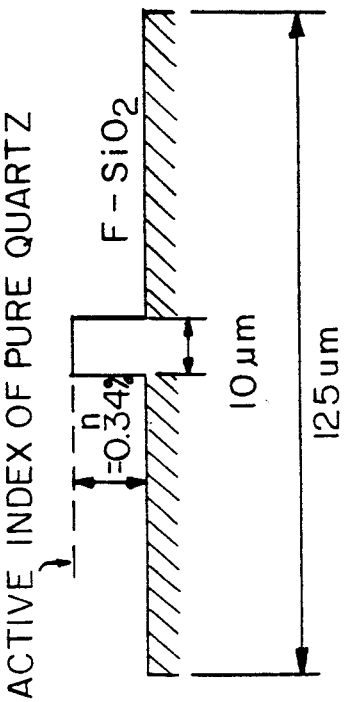
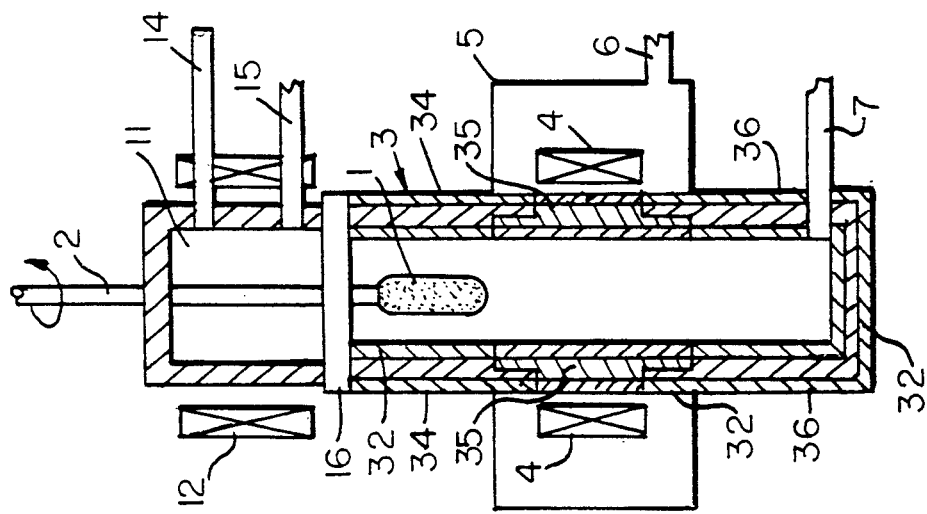

METHOD OF PRODUCING GLASS PREFORM IN FURNACE FOR HEATING GLASS

This is a continuation of application Ser. No. 07/714,028, filed on Jun. 12, 1991 abandoned, was a continuation of Ser. No. 07/578,293 filed Sep. 6, 1990, abandoned.

BACKGROUND OF THE INVENTION

1. Field of the Invention

The present invention relates to a furnace for heating a glass preform for an optical fiber and a method for producing such glass preform. More particularly, it relates to a heating furnace and a method for heating a porous glass preform consisting of fine particles of quartz glass to thermally treat. The heating furnace of the present invention can prevent contamination of the glass preform with impurity elements and has good durability.

The term "thermally treat" is intended to mean that the glass preform is heated in a muffle tube which is installed inside a heater element to separate an heating atmosphere from the heater element so that the preform is dehydrated, fluorine-added and/or vitrified.

2. Description of the Related Art

As one of general methods for mass producing a glass preform for use in the fabrication of an optical fiber, the VAD (Vapor Phase Axial Deposition) method is known. The VAD method comprises depositing fine particles of glass generated in oxyhydrogen flame on a rotating starting member such as a glass plate or rod to form a cylindrical porous preform (soot preform) and sintering said porous preform to obtain a transparent glass preform for use in the fabrication of the optical fiber.

In the VAD method, for sintering the porous preform to covert it into transparent glass, the preform should be heated in an atmosphere of an inert gas (e.g. helium and argon) to a temperature of 1,600° C. or higher. As a heating furnace for sintering the preform, usually a heating furnace having a carbon heater is used. What should be taken care of when sintering the preform in such heating furnace is inclusion of transition metals such as copper or iron and water. When 1 (one) ppb or larger of the transition metal is included in the glass preform, transmission loss wavelength characteristics of the fabricated optical fiber is greatly deteriorated in an entire wavelength range. When 0.1 ppm or larger of water is included in the preform, the characteristics of the fabricated optical fiber is impaired in a longer wavelength range.

Therefore, the porous preform is usually dehydrated before or during vitrification. As a dehydration method, it is known to heat the porous preform at a high temperature in an atmosphere of an inert gas containing a chlorine-containing gas. When the porous preform is heated at a high temperature in an atmosphere of an inert gas containing a fluorine-conatining gas, fluorine is added to the porous preform. When the fluorine is added to the porous preform, a refractive index profile which is essential to the optical fiber is advantageously adjusted. In this connection, Japanese Patent Publication No. 15682/1980 and Japanese Patent Kokai Publication No. 67533/1980 can be referred. These publications will be discussed below.

The treatment with the fluorine-containing gas is carried out in the heating furnace before or simultaneously with vitrification. To prevent wastage of the carbon heater due to moisture or oxygen which is generated during heating of the preform, a muffle tube is installed for separating the carbon heater and the sintering atmosphere. As the muffle tube, a quartz glass made one is conventionally used.

Japanese Patent Publication Nos. 58299/1983 and 42136/1983 and Japanese Patent Kokai Publication No. 86049/1985 disclose the use of the quartz glass made muffle tube in detail.

The fluorine-containing gas is decomposed or reacts at a high temperature to form $F_2$ gas or HF gas. These gases react with the quartz glass according to the following reaction formulae to generate $SiF_4$ gas, and by these reactions, the quartz glass is etched:

$$SiO_2 + 2F_2 \rightarrow SiF_4 + O_2$$

$$SiO_2 + 4HF \rightarrow SiF_4 + 2H_2O$$

Because of such etching, copper and iron present inside the quartz glass appear on the surface and contaminate the porous preform. In addition, by etching, pin holes are formed in the quartz made muffle tube, which is a cause of intake of environmental air or leakage of the atmosphere in the muffle tube. These are not advantageous for the production method.

Furthermore, the quartz glass tube has a very bad problem that it tends to easily deform at a high temperature. That is, when the quartz glass is kept at about 1,300° C. for a long time, it deforms due to viscous flow. In addition, when it is used at a temperature of 1,150° C. or higher for a long time, it is devitrified, and once the furnace temperature is lowered, strain is generated due to difference of thermal expansion coefficient between the glass phase and the devitrified phase and finally breaks the tube.

As a material which hardly reacts with the fluorine-containing gas or the chlorine-containing gas, carbon is contemplated. The carbon does not either react with $SF_6$, $C_2F_6$, $CF_4$ and the like which easily react with the quartz. Of course, the carbon does not react with $SiF_4$.

Japanese Patent Publication No. 28852/1981 suggests the use of a carbon made muffle tube in an atmosphere comprising the fluorine-containing gas such as $F_2$, although no working example is described.

However, the carbon has following drawbacks:

1. Since the carbon has minute pores, gases can penetrate therethrough. Permeability of nitrogen through the carbon is $10^6$ times larger than through the quartz glass.

2. The carbon is easily oxidized and, at a temperature not lower than 400° C., it easily reacts with oxygen to form $CO_2$ or CO.

To prevent oxidation, it has been proposed to form a layer of ceramics such as SiC, $Al_2O_3$ and BN on an inner wall of the carbon muffle tube. Although the ceramics layer prevents the oxidation, it disadvantageously reacts with at least one of the chlorine-containing gas and the fluorine-containing gas. Impurities generated by such reaction devitrify the soot preform and generate bubbles in the soot preform.

Since the carbon is a material having large gas permeability as described above, the gas goes in and out through the wall of the muffle tube so that the moisture in the air penetrates into the muffle tube through the wall. Therefore, the glass preform contains a comparatively large amount of water and in turn the hydroxyl groups. In addition, the gasses such as $Cl_2$ and $SiF_4$ are released outside the furnace through the wall and may pollute a work environment, and impurities (e.g. copper and iron) may penetrate into the furnace from the outside. These defects can be considerably overcome by increasing the thickness of carbon, but still not completely.

As explained above, the addition of fluorine to the quartz glass of the cladding part by the conventional methods encounters various difficulties.

SUMMARY OF THE INVENTION

In view of such circumstances, the present invention intends to solve the problems of the conventional muffle tube which is used in dehydration and vitrification of the preform for the optical fiber and addition of the fluorine to the preform and to provide a muffle tube for producing the glass preform for the optical fiber, which has improved durability and long life and can prevent the penetration of the air into the muffle tube.

As a result of the extensive study to solve the above described problems, it has been found that when an inner wall and an outer wall of a muffle tube are coated with pyrolytic graphite or solid-phase carbonized glassy carbon, the muffle tube is not deteriorated even if a corrosive gas such as the fluorine-containing gas and the chlorine-containing gas is supplied at a high temperature. This is because the muffle tube does not react with the fluorine-containing gas or the chlorine-containing gas since the inner wall is coated with the carbon coating. Thus, such the muffle tube has a much longer life than the conventional ones. In addition, the carbon is so dense that it does not suffer from a problem such as the gas penetration which arises in the use of the conventional carbon made muffle tube.

Accordingly, the present invention provides a heating furnace for heating a porous preform made of fine particles of quartz base glass for an optical fiber which comprises a heater and a muffle tube positioned inside the heater to separate a heating atmosphere from the heater, wherein the muffle tube body consists of highly pure carbon and an inner wall and an outer wall of the body are coated with a carbon material selected from the group consisting of pyrolytic graphite and solid-phase carbonized glassy (or vitreous) carbon.

BRIEF DESCRIPTION OF THE DRAWINGS

FIGS. 4A and 4B illustrate methods for producing a soot preform by flame hydrolysis, FIG. 5 shows a refractive index profile of the preform produced by the process according to the present invention, FIG. 6 schematically shows a cross sectional view of the heating furnace which was used in Example 2 which will be described below.

DETAILED DESCRIPTION OF THE INVENTION

Figure 1:
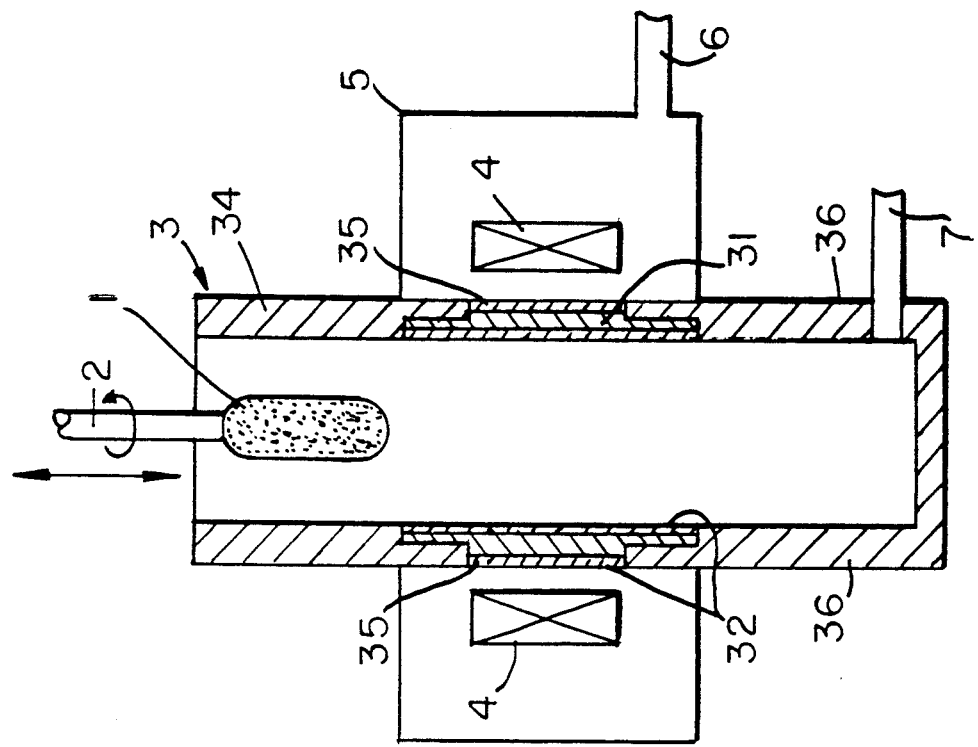
FIG. 1 schematically shows a cross sectional view of one example of the first embodiment of the heating furnace for the preform of the optical fiber according to the present invention, FIG. 2 schematically shows a cross sectional view of one example of the second embodiment of the heating furnace for the preform of the optical fiber according to the present invention, FIG. 3 schematically shows a cross sectional view of one example of the third embodiment of the heating furnace for the preform of the optical fiber according to the present invention.

In the present invention, a porous glass preform consisting of fine particles of the quartz base glass (hereinafter, occasionally referred to as "soot preform") typically includes soot preforms having the following structures:

1. A solid or hollow soot preform the entire of which consists of fine particles of the glass. In case of the former, after vitrifying the soot preform, a bore is formed at a center part, and then a glass rod is inserted in the bore to produce a final glass preform.

2. A soot preform comprising a glass core and fine particles of the glass deposited around the core.

3. A soot preform comprising a glass core around which a part of the cladding has been formed and fine particles of the glass deposited around the cladding.

The pyrolytic graphite (which may be referred to as "pyrolytic carbon") and the solid-phase carbonized glassy carbon coated on the inner wall and the outer wall of the muffle tube body are carbon materials as follows.

The pyrolytic graphite means graphite produced on a body by depositing carbon which is formed by thermally decomposing a raw material mainly comprising a hydrocarbon at a high temperature (e.g. 700° to 1200° C). Various manners can be used to coat the muffle tube body with the pyrolytic graphite. For example, the muffle tube body is directly heated with electric current or indirectly heated from its outside and the carbon material produced by thermal decomposition of a hydrocarbon gas (e.g. propane, methane and so on) is deposited on the body.

The solid-phase carbonized glassy carbon means carbon which is produced by curing and carbonizing a resin extremely slowly. The resin includes, for example, thermosetting resins such as phenol resins and furan resins and polyvinyl chloride resins. Alternatively, the vitrified carbon may be produced by carbonization of sugar, cellulose, polyvinylidene chloride and so on. In order to coat the muffle tube body with the vitrified graphite, the thermosetting resin is applied to the body by shaping or multiple spraying and carbonizing the resin extremely slowly.

The carbon material which is used for the muffle tube body is preferably a highly pure carbon material which has purity as described below. A thickness of the coating can be selected depending on the conditions under which the preform is thermally treated.

Generally, purity of the carbon material used for the muffle tube body is preferably such degree that a total ash content is not larger than 50 ppm, preferably not larger than 20 ppm. The carbon having the total ash content of 1,000 ppm cannot be used for making the muffle tube body in view of the impurities such as iron and copper. The impurities and their amounts contained in the carbon having the total ash content of 20 ppm or less are as shown in following Table.

TABLE 1

| B  | <0.1 ppm | Ca | <0.1 ppm |
|----|----------|----|----------|
| Mg | <0.1 ppm | Ti | <0.1 ppm |

TABLE 1-continued

| | |
|---|---|
| Al <0.1 ppm | V <0.1 ppm |
| Si <0.8 ppm | Cr <0.1 ppm |
| P <0.2 ppm | Fe <0.1 ppm |
| S <0.1 ppm | Cu <0.1 ppm |
| Ni <0.1 ppm | |

As a dehydrating agent for the preform consisting of the fine glass particles, a chlorine-containing gas is generally used. When the heating furnace of the present invention is used, the chlorine-containing gas having no oxygen atom such as $Cl_2$, $SiCl_4$ or $CCl_4$ should be selected. When the chlorine-containing gas having the oxygen atom such as $SOCl_2$ is used, it is decomposed at a high temperature on the dehydration to liberate the oxygen, whereby the carbon material is disadvantageously wasted by the oxygen. $CCl_4$ is thermally decomposed to generate carbon powder. $Cl_2$ reacts with water contained in the porous preform to form a small amount of oxygen according to the following reaction formula:

$$Cl_2 + H_2O \rightarrow 2HCl + (\tfrac{1}{2})O_2$$

However, $SiCl_4$ reacts with water contained in the porous preform according to the following reaction formula:

$$SiCl_4 + 2H_2O \rightarrow SiO_2 + 4HCl$$

Thus, neither oxygen nor carbon powder is generated. Therefore, $SiC_4$ is the most preferred dehydrating agent in the use of the muffle tube of the present invention. Usually, a dehydrating temperature is in the range of 800° to 1200° C. The dehydration treatment is performed in an atmosphere of the chlorine-containing gas in the mixture with an inert gas such as argon or helium at 0.1 to 10% by mole of the chlorine-containing gas.

As a fluorine-adding gas, generally a fluorine-containing gas is used. When a quartz made muffle tube is used, the fluorine-containing gas is decomposed at a high temperature to produce fluorine gas which etches the muffle tube. Thus, the fluorine-containing gas which does not etch the muffle tube should be selected.

However, since the muffle tube of the heating furnace of the present invention does not react with the fluorine gas, a wide variety of the fluorine-adding gas can be used and then a silicon fluoride and a carbon fluoride can be selected. The silicon fluoride includes $SiF_4$, $Si_2F_6$ and so on, and the carbon fluoride includes $CF_4$, $C_2F_6$, $C_3F_8$, $CCl_2F_2$, $C_2Cl_3F_3$ and so on.

Among them, $SiF_4$ is preferable since it is easily available, though it is toxic and expensive. In addition, the carbon fluoride is more preferable since it is not only cheap and safe but also easily handled. Especially, $CF_4$ is the most preferable in the use of the muffle tube of the present invention, since no carbon powder is generated from $CF_4$.

Usually, a fluorine-adding temperature is in the range of 1100° to 1600° C. The fluorine-adding treatment is performed in an atmosphere of the fluorine-containing gas diluted with an inert gas such as argon or helium at 0.1 to 100% by mole of the fluorine-containing gas.

When the glass preform is vitrified in the use of the muffle tube of the heating furnace of the present invention, an inert gas such as helium, nitrogen or argon is supplied in the muffle tube at a temperature of 1400° to 1600° C.

Now, the experiments and concepts on which the present invention is based will be explained. Needless to say, the below explained concepts could be established on the findings from the effective experiments by the present inventors and were not easily assumed.

ANALYSIS OF HEAT RESISTANCE

Experiment 1

A quartz glass made muffle tube having an inner diameter of 100 mm, a length of 300 mm and a wall thickness of 2 mm was heated to a temperature of 1,500° C. and kept at the same temperature for one day. The muffle tube was expanded to a length of 400 mm.

Experiment 2

A highly pure carbon made muffle tube having the same size as the muffle tube in Experiment 1 was used. The muffle tube has the pyrolytic graphite coatings in a thickness of 30 μm on its inner and outer walls. The muffle tube was heated as in Experiment 1, but the tube was not expanded. In addition, when the coating was the solid-phase carbonized glassy carbon in a thickness of 10 μm, there was no expansion.

In this experiment, the pyrolytic graphite coating was formed on the muffle tube body by supplying a hydrocarbon gas which was at a temperature of 1000° C. The vitrified carbon coating was formed on the body by curing and carbonizing a polyvinyl chloride resin.

In the following experiments, the coatings were formed as described above as long as there is no special reference.

Experiment 3

The same muffle tube as used in Experiment 1 was heated from room temperature to 1,500° C. over 3 hours in one day and cooled from 1,500° C. to room temperature in next one day. After repeating heating and cooling for 20 days, the muffle tube was broken due to devitrification.

Experiment 4

The same muffle tube as used in Experiment 2 was subjected to the same heating test as in Experiment 3. After 20 days, no problem arose.

ANALYSIS OF OXIDATION RESISTANCE

Experiment 5

The same muffle tube as in Experiment 2 was used in an atmosphere of air at a temperature of 500° C. for one hour. No oxidation was observed.

Experiment 6

The same oxidation test as in Experiment 5 was repeated with the use of the muffle tube which does not have the pyrolytic graphite coating or the solid-phase carbonized glassy carbon coating. The carbon made muffle tube was wasted with oxidation in a thickness of 50 μm.

ANALYSIS OF CORROSION RESISTANCE

Experiment 7

A pyrolytic graphite coating having a thickness of 30 μm was provided on an inner and an outer walls of a muffle tube having the same size as in the muffle tube in Experiment 1. The muffle tube was heated to 1050° C. in an atmosphere of helium containing 5% by mole of Cl$_2$. No corrosion of the muffle tube was observed. In addition, no leakage of the Cl$_2$ through the tube wall was observed.

Similarly, a highly pure carbon made muffle tube having a coating of the solid-phase carbonized glassy carbon in a thickness of 10 μm was heated. Neither corrosion nor leakage of the Cl$_2$ was observed.

This is because the dense coating of the pyrolytic graphite or the solid-phase carbonized glassy carbon prevented the leakage of the Cl$_2$.

Experiment 8

The same test as in Experiment 7 was repeated with using a highly pure carbon made muffle tube without the coatings. The leakage of the Cl$_2$ gas through the tube wall was observed.

Experiment 9

The same test as in Experiment 7 was repeated with using a muffle tube having silicon carbide coatings instead of the pyrolytic graphite coatings or the solid-phase carbonized glassy carbon coatings on an inner and an outer walls. The silicon carbide coatings reacted and volatilized. In addition, leakage of Cl$_2$ through the wall was observed.

SiC reacted according to the following reaction formula:

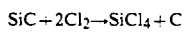
$$SiC + 2Cl_2 \rightarrow SiCl_4 + C$$

Experiment 10

The same muffle tube as in used in Experiment 2 was heated in an atmosphere of helium containing 3% by mole of SiF$_4$ at a temperature of 1400° C. No corrosion and no leakage of SiF$_4$ through the tube wall was observed.

Experiment 11

The same test as in Experiment 10 was repeated with using the same muffle tube as used in Experiment 9 having SiC coatings on the inner and the outer walls. The inner and the outer coatings reacted and volatilized.

Thus, such muffle tube had a problem on a long period operation.

From the results of Experiments 1 to 11, following can be concluded:

1) The highly pure carbon made muffle tube having the coatings of the pyrolytic graphite or the solid-phase carbonized glassy carbon on its inner and outer walls can be resistant to very high temperature in comparison with the pure quartz glass made muffle tube.

2) The muffle tube having the pyrolytic graphite coatings or the solid-phase carbonized glassy carbon coatings on its inner and outer walls can be remarkably resistant to oxidation in comparison with the conventional highly pure carbon made muffle tube.

3) When Cl$_2$ or the fluorine-containing gas is used, the muffle tube of the heating furnace according to the present invention is corrosion-resistant. The quartz made muffle tube has a defect in the resistance against the fluorine-containing gas. For example, a quartz made muffle tube is etched by SiF$_4$ by 1.6 μm/hr. at a temperature of 1100° C. The highly pure carbon made muffle tube having the coating of SiC has a defect in the resistance against both chlorine-containing gas and fluorine-containing gas.

DETAILED DESCRIPTION PREFERRED EMBODIMENTS

Now, preferred embodiments of the heating furnace of the present invention will be described with reference to the accompanying drawings.

The first embodiment of the heating furnace according to the present invention is shown in a schematic cross sectional view.

In FIG. 1, numeral 1 stands for a porous preform, 2 stands for a supporting rod, 3 stands for a muffle tube, 4 stands for a heater, 5 stands for a furnace body, 6 stands for an inlet for introducing an inert gas, and 7 stands for an inlet for introducing an atmosphere gas (e.g. SiF$_4$ and helium). 31 stands for a body of the carbon made muffle tube and 32 stands for a pyrolytic graphite coating or a solid-phase carbonized glassy carbon coating. In the embodiment shown in FIG. 1, the muffle tube has the coating entirely on its outer and inner walls (including the bottom portion).

With using the muffle tube as described above, the soot preform is traversed through the muffle tube and thermally treated.

In the second embodiment of the present invention, the muffle tube consists of an upper, middle and lower parts which are detachably connected, and at least the middle part is made of highly pure carbon material having a coating of the pyrolytic graphite or the solid-phase carbonized glassy carbon and the upper and lower parts are made of a heat and corrosion resistant material.

Now, the second embodiment of the present invention will be illustrated by making reference to the figure.

Figure 2:
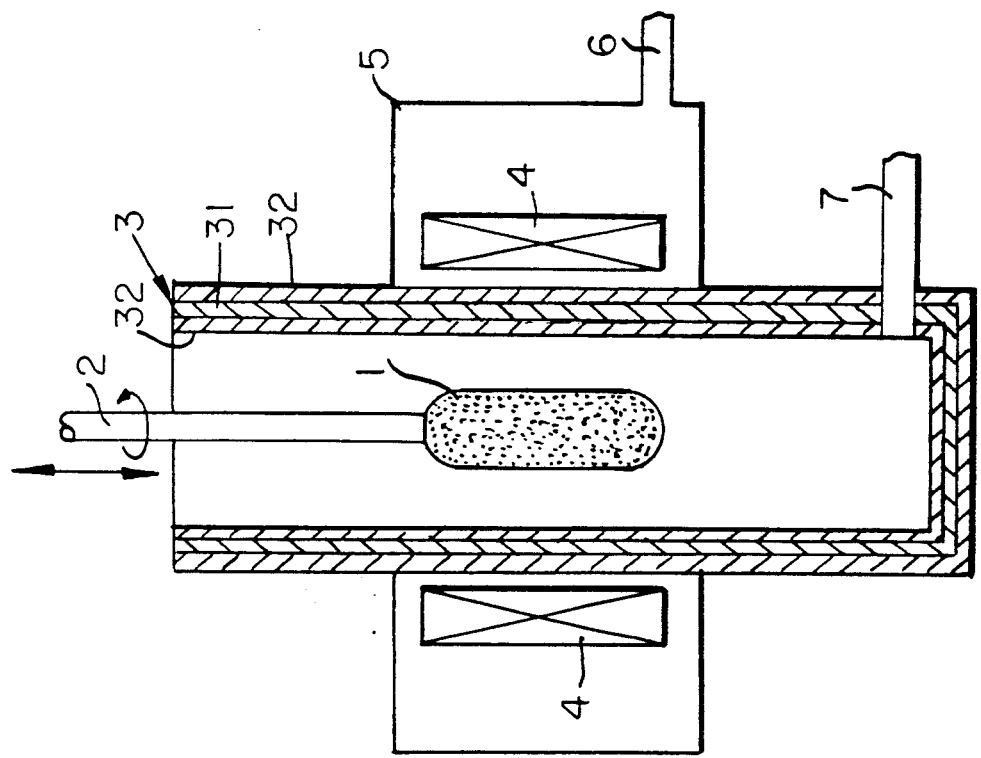

FIG. 2 schematically shows a cross sectional view of this embodiment of the heating furnace. A heater 4 is installed inside a furnace body 5, and a muffle tube 3 is installed at the center of the furnace body.

The muffle tube 3 consists of an upper part 34, a middle part 35 and a lower part 36, and the adjacent parts are detachably connected by suitable means such as screwing. The middle part 35 of the muffle tube is made of the highly pure carbon material 31 having coatings 32 of the pyrolytic graphite or the solid-phase carbonized glassy carbon.

Since the upper and lower parts (34 and 36) are not heated to so high temperature as the middle part 35, they may be made of the highly pure carbon material having coatings of SiC or Si$_3$N$_4$ which is resistant to oxidation, corrosion, the chlorine-containing gas and/or the fluorine-containing gas. SiC and Si$_3$N$_4$ does not react with Cl$_2$ or F at a low temperature. For clarification, the coatings on the upper part and the lower parts are not shown.

In order to apply the SiC or Si$_3$N$_4$ coating on the body, for example the CVD (Chemical Vapor Deposition) method can be used.

The muffle tube the body of which is made of the highly pure carbon is preferable since it does not react with the halogen-containing compound unless the atmosphere contains oxygen and water, and has excellent heat resistance.

During the treatment of the porous preform, the carbon of the middle part 35 is exposed to high temperature and worn by moisture occluded in the preform and moisture and oxygen migrated from outside after long time use. The carbon inner wall tends to wear due to special causes associated with the treatment of the porous preform which will be explained below.

That is, $SiO_2$ powder liberated from the porous preform adheres to the carbon inner wall and reacts with the carbon to form SiC, and oxygen generated by said reaction further reacts with the carbon to form CO. Formed SiC readily reacts with the chlorine-containing gas which is used for dehydration. The carbon inner wall is worn by such reaction with the $SiO_2$ powder.

These reactions can be expressed by following formulae:

$$SiO_2 + C \rightarrow SiC + O_2$$

$$O_2 + 2C \rightarrow 2CO$$

$$SiC + Cl_2 \rightarrow SiCl_4 + C$$

Therefore, the middle carbon part should be replaced with a new one after prolonged use.

On the contrary, since the upper and lower parts of the muffle tube are not subjected to a high temperature so that they are not so severely worn, only the middle part can be preferably replaced when the muffle tube consists of three parts.

Since the carbon is porous, it is necessary to thoroughly remove absorbed moisture at a high temperature. Therefore, in view of the removal of the absorbed moisture, it is preferred to replace the carbon muffle tube as less frequently as possible. When the middle part of the muffle tube of this embodiment invention is worn out, it is not necessary to remove the absorbed moisture from the upper and lower parts since they can still continuously used. Apart from the economy, the three part muffle tube of this embodiment has various advantages.

One of the measures to prevent such oxidation of the muffle tube is to reduce the temperature to 500° C. or lower at which the carbon is not oxidized during the insertion and removal of the glass preform. However, at such low temperature, an operation rate of the furnace is greatly decreased. The contamination of the interior space of the muffle tube with the dusts in the air cannot be prevented. The inflow of the air into the muffle tube can be prevented by the third embodiment of the heating furnace according to the present invention. In addition to the heater and the muffle tube, the heating furnace of the third embodiment comprises a front chamber through which the porous preform is inserted into and removed from the muffle tube. Preferably, the front chamber can be heated up to 800° C. and evacuated to a pressure down of $10^{-2}$ Torr. or less.

The front chamber is preferably made of a heat resistant material which liberates no impurity, such as quartz glass, SiC, $Si_3N_4$, BN and the like. The front chamber may be made of the same material as or different from that of the muffle tube.

The third embodiment of the heating furnace will be explained by making reference to the accompanying figures.

FIG. 3 schematically shows a cross sectional view of one example of the third embodiment of the heating furnace. This heating furnace is the same as that of FIG. 2 to which the front chamber 11 is attached. Namely, in addition to all the parts of the heating furnace of FIG. 2, this heating furnace comprises the front chamber 11, an outlet 14 for front chamber gas, an inlet 15 of a gas for purging the gas in the front chamber and a partition 16. In FIG. 3, the coatings of the upper part and the lower part are shown.

The insertion of the porous preform into the heating furnace of FIG. 3 is carried out as follows:

1. The partition 16 which separates the front chamber 11 and the heating atmosphere is closed. (At an initial position and during the treatment of the soot preform, the partition is opened.)

2. To a rotatable vertically movable chuck, the porous preform 1 is attached through the supporting rod 2.

3. An upper cover of the front chamber 11 is opened, and the porous preform 1 is lowered into the front chamber 11.

4. The upper cover is closed, and the interior space of the front chamber is purged with an inert gas (e.g. nitrogen or helium).

5. The partition 16 is opened, and the porous preform 1 is introduced in the heating atmosphere which has been kept at a temperature at which the preform is thermally treated.

The preform is removed from the heating furnace of the present invention as follows:

1. The preform is pulled up from the heating atmosphere to the front chamber 11 after the thermal treatment. Then, the temperature of the heating atmosphere is not necessarily lowered.

2. The partition 16 is closed.

3. The upper cover of the front chamber 11 is opened, and the preform 1 is removed from the chamber 11.

According to another aspect of the present invention, there is provided a method for producing a glass preform for an optical fiber which comprises thermally treating a porous preform comprising fine particles of quartz base glass in a heating furnace comprising a highly pure carbon made muffle tube an inner wall and an outer wall of which are made of a carbon material selected from the group consisting of pyrolytic graphite and solid-phase carbonized glassy carbon in an inert gas atmosphere containing, as an agent for adding fluorine to the glass, at least one fluoride selected from the group consisting of silicon fluorides and carbon fluorides so as to add fluorine to the glass, preferably after dehydration of the preform, and simultaneously or thereafter, vitrifying the fine particles of the glass to give a glass preform.

To completely remove the contaminations during processing of the muffle tube or absorbed dust and moisture, the muffle tube is preferably baked for several hours in an atmosphere comprising the chlorine-containing gas, particularly $Cl_2$ at a temperature not lower than 1500° C. When the optical fiber is fabricated from the glass preform which is produced by means of an unbaked muffle tube, it may have considerable absorption due to the moisture or the impurities.

The conditions and the gases described above in connection with the embodiments of the heating furnace of the present invention may be applied in the method according to the present invention.

Among the fluorine-dopant to be used in the method of the present invention, $SiF_4$ is most preferred. $SiF_4$ is preferably a highly pure product of 3N or higher.

Although $SiF_4$ does not react with the carbon at all, when the soot preform is used without thorough dehydration, it may generate fume in the carbon made muffle tube in the step of addition of fluorine. Such fume can be generated by the reaction of the moisture in the soot preform with $SiF_4$ or the carbon. As the result, deposits which may be carbon particles are accumulated on the upper portion of the soot preform. To prevent this, preferably, the soot preform is dehydrated before thermally treating it in the muffle tube having the atmosphere containing SiF₄.

Although it is possible to dehydrate the soot preform simultaneously with the addition of fluorine, the dehydration is carried out before the addition of fluorine because of the reasons described above and dehydration effect.

The addition of fluorine to the soot preform with $SiF_4$ is effectively performed at a temperature of 1,000° C. or higher, preferably from 1,100° to 1,400° C. A sufficient amount of fluorine should be added to the preform before the shrinkage of the soot preform is completed. If the soot preform shrinks before the sufficient amount of fluorine is added, fluorine is not added to the entire preform and is ununiformly added so that distribution of the amount of added fluorine is formed in the preform.

The soot preform is generally produced by the flame hydrolysis method and consists of fine particles of glass having a particle size of 0.1 to 0.2 μm.

The present invention will be explained further in detail.

PRODUCTION OF SOOT PREFORM

To produce a mass of fine particles of quartz glass by flame hydrolysis, by using a quartz glass made coaxial multi tube burner 41 as shown in FIG. 4A, oxygen, hydrogen and, as a raw material gas, $SiCl_4$ or a mixture of $SiCl_4$ and a doping compound (e.g. $GeCl_4$) are supplied to the center of the oxyhydrogen flame together with an inert gas such as argon or helium as a carrier gas to react them.

An inert gas for shielding is supplied so that the raw material gas reacts in a space several millimeters apart from the front end of the burner 41. To produce a rod form soot preform, the particles of the glass are deposited on the lower tip of a rotating seed rod 46 in a direction of the axis of the seed rod 46. To produce a pipe form soot preform, the particles of the glass are deposited around a periphery of a rotating quartz or carbon rod 46 with traversing the burner 41 as shown in FIG. 4B, and then the rod 46 is removed. The rod 46 can be a glass rod for the core. In such case, it is not necessary to remove the rod. Plural number of burners 41 may be used.

FLUORINE ADDITION TO SOOT PREFORM AND VITRIFICATION (SINTERING) OF PREFORM

In the muffle tube (cylindrical muffle tube with upper and lower flanges) made of highly pure carbon the inner wall and the outer peripheral wall of which are coated with a material having small gas permeability, for example, as shown in FIG. 2, the soot preform produced in the above step is suspended at a position above the heater, and the interior of the muffle tube is filled with an atmosphere of helium containing $Cl_2$ gas. After heating the atmosphere to 1,050° C. by the heater, the soot preform is lowered at a rate of 2 to 10 mm/min. After the whole soot preform passes the heater, the lowering of the soot preform is stopped and the supply of the $Cl_2$ gas is terminated. Then, the atmosphere is changed to a helium atmosphere containing $SiF_4$. After the heater temperature reaches 1,400° C., the soot preform is pulled up at a rate of 4 mm/min. so as to add fluorine to the preform.

After the whole soot preform passed the heater again, the pulling up of the soot preform is stopped. The supply of the $SiF_4$ is terminated and the supply of helium is continued. After the heater temperature reaches 1600° C., the soot preform is lowered at a rate of 3 mm/min. to vitrify the preform.

The present invention will be illustrated by following Examples.

EXAMPLE 1

A porous glass preform was dehydrated, fluorine-added and vitrified with using the heating furnace as shown in FIG. 2.

The muffle tube had an inner diameter of 200 mm, a wall thickness of 10 mm and a length of 1000 mm. The muffle tube consisted of three parts. The middle part was made of highly pure carbon and had the pyrolytic graphite coatings on its inner and outer walls in a thickness of 30 μm. The upper and lower parts were made of highly pure carbon and had SiC coatings on their inner and outer walls in a thickness of 50 μm, respectively.

The conditions of the thermal treatments were as follows:

Dehydration
Heater temperature: 1050° C.
Atmosphere gas: $Cl_2$/He = 5 mol %/95 mol %
Lowering rate of preform: 5 mm/min.
Fluorine addition
Heater temperature: 1370° C.
Atmosphere gas: $SiF_4$/He = 3 mol %/97 mol %
Pulling up rate of preform: 3 mm/min.
Vitrification
Heater temperature: 1600° C.
Atmosphere gas: He 100%
Lowering rate of preform: 5 mm/min.

The specific refractive index difference Δn of the obtained transparent preform was 0.34%. The specific refractive index difference herein used is defined as follows:

$$\Delta n = \frac{(n_{SiO_2} - n_F)}{n_{SiO_2}} \times 100(\%)$$

[wherein $n_{SiO_2}$ and $n_F$ indicate refractive indices of pure quartz and a fluorine added preform, respectively.]

A pure quartz core single mode optical fiber was fabricated with using the produced preform. The optical fiber had transmission loss of 0.17 dB/km at a wavelength of 1.55 μm and had no absorption due to the presence of Cu and Fe.

Fifty preforms were thermally treated in the muffle tube which is described above and no deterioration of the muffle tube was observed.

EXAMPLE 2

Figure 6:
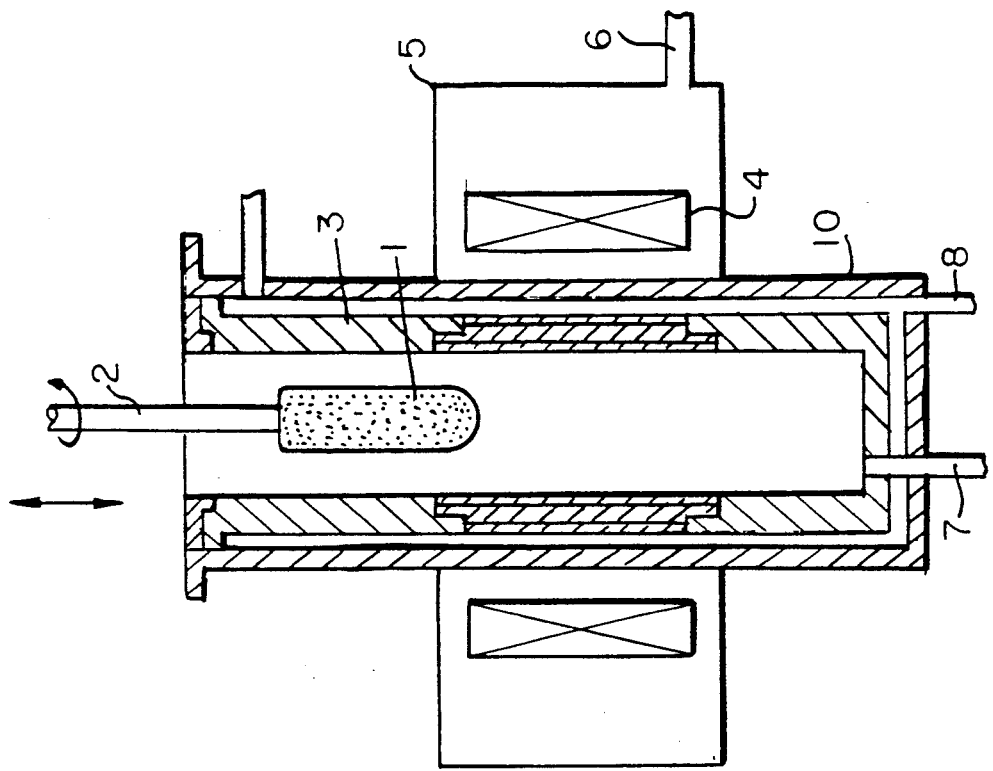

A muffle tube having a double tube structure as shown in FIG. 6 was used. The muffle tube was in such structure that the muffle tube 3 as used in Example 1 was inserted into a highly pure carbon made outer tube 10. The outer tube 10 had pyrolytic graphite coatings entirely on its inner and outer walls in a thickness of 30 μm. For clarification, the coatings of the outer tube were not shown.

Thermal treatments were performed under the same conditions as employed in Example 1. In this example, He gas was supplied in a space between the outer tube and the muffle tube at 10 l/min. from an inlet 8 so that an operating pressure in the space is lower than that in the muffle tube.

A pure quartz core single mode optical fiber was fabricated with using the produced preform as a cladding part. The optical fiber had transmission loss of 0.17 dB/km at a wavelength of 1.55 μm and residual water in the optical fiber was less than 0.01 ppm.

The heating furnace used in this example had an advantage that work environment is not directly contaminated since the an atmosphere gas slightly leaking through connections between the muffle tube parts which may arise in Example 1 can be entrained with the He gas supplied in the space between the muffle tube and the outer tube.

A muffle tube which had the solid-phase carbonized glassy carbon coatings (thickness of 10 μm) in place of the pyrolytic graphite coatings was used under the same conditions as those in the case where the muffle tube having the pyrolytic coatings was used. The same results as in the case in which the muffle tube having the pyrolytic graphite coatings was used.

EXAMPLE 3

A heating furnace as shown in FIG. 3 was used. The muffle tube installed in the heating furnace had the pyrolytic graphite coatings (thickness of 30 μm) or the solid-phase carbonized glassy coatings (thickness of 10 μm) on its entire inner and outer walls.

The porous preform was inserted in the front chamber 11 which had been heated to 200° C. and the upper cover was closed. Nitrogen gas was supplied at a rate of 10 l/min. for 10 minutes to replace the interior atmosphere in the front chamber with nitrogen. Then, the partition 16 was opened, and the porous preform 1 was inserted in the muffle tube from the front chamber, and dehydrated, fluorine-added and vitrified to produce a transparent glass preform for the optical fiber. To remove the preform from the heating furnace, the preform was moved to the front chamber, the partition was closed, and then the upper cover was opened followed by removal of the preform.

The conditions of the thermal treatments were as follows:
Dehydration
Heater temperature: 1050° C.
Atmosphere gas:
  SiCl$_4$ 200 cc/min.
  He 20 l/min.
Traverse rate of preform: 5 mm/min.
Fluorine addition
Heater temperature: 1270° C.
Atmosphere gas:
  SiF$_4$ 800 cc/min.
  He 20 l/min.
Traverse rate of preform: 4 mm/min.
Vitrification
Heater temperature: 1500° C.
Atmosphere gas:
  He 20 l/min.
  SiF$_4$ 800 cc/min.
Traverse rate of preform: 10 mm/min.

An optical fiber was fabricated with using the produced glass preform as a cladding part, and had low transmission loss of 0.17 dB/km at a wavelength of 1.55 μm.

In this example, since the heating furnace comprises the front chamber, the temperature of the muffle tube is not required to lower to less than 800° C. so that this embodiment is advantageous in view of productivity of the thermally treated preform.

COMPARATIVE EXAMPLE 1

In the same manner as in Example 1 but using a quartz glass made muffle tube containing 1 ppm of copper but having no carbon lining, an optical fiber was fabricated. The optical fiber contained 0.01 ppm of residual water, and had absorption due to copper near to a wavelength of 1.30 μm. This was sufficiently low in comparison with absorption by the conventional optical fiber and the absorption value was 2 to 3 dB/km at a wavelength of 0.8 μm. However, the inner wall of the muffle tube was severely etched. This means that this muffle tube had insufficient corrosion resistance.

COMPARATIVE EXAMPLE 2

Heat Resistance of a Quartz Glass Made Muffle Tube

In the same manner as in Example 1 but using the quartz glass made muffle tube in place of the carbon made muffle tube, a soot preform was produced. The quartz glass made muffle tube was expanded during vitrification of the soot preform and could not be reused.

COMPARATIVE EXAMPLE 3

Etching of a Quartz Glass Made Muffle Tube

In the procedures of Comparative Example 2, SF$_6$ was used in place of SiF$_4$. Then, the quartz glass made muffle tube was heavily etched to form pin holes in the wall near the heater. The produced glass preform contained several ppm of water. Of course, the muffle tube was considerably expanded and could not be reused.

COMPARATIVE EXAMPLE 4

The same heating furnace as in Example 1 was used except that the highly pure carbon made muffle tube had a SiC coating in a thickness of 50 μm on only its outer wall instead of the pyrolytic graphite coatings.

A glass preform was thermally treated under the same conditions as those in Example 1. A single mode optical fiber was fabricated from the produced preform. The optical fiber had low transmission loss of 0.18 dB/km at a wavelength of 1.55 μm.

However, with using the heating furnace repeatedly, Cl$_2$ gas through the carbon body peeled off the SiC coating and penetrated the furnace body, and then the heating furnace could not be reused. In addition, serious problems on work environment arose.

EXAMPLE 4

The same heating furnace as used in Example 1 was used except that the highly pure carbon made muffle tube had solid-phase carbonized glassy carbon coatings in a thickness of 10 μm on its inner and outer walls instead of the pyrolytic graphite coatings.

A glass preform was thermally treated under the same conditions as those in Example 1.

Optical fibers fabricated from the first preform to the fifth preform had larger transmission loss by 0.02 to 0.03 dB/km at a wavelength of 1.55 μm than those fabricated from the preforms which were treated in the muffle tube having the pyrolytic graphite coatings. This is due to distribution of element concentration through a thickness of the coatings as shown in graphs of FIGS. 7 and 8.

Figure 7:
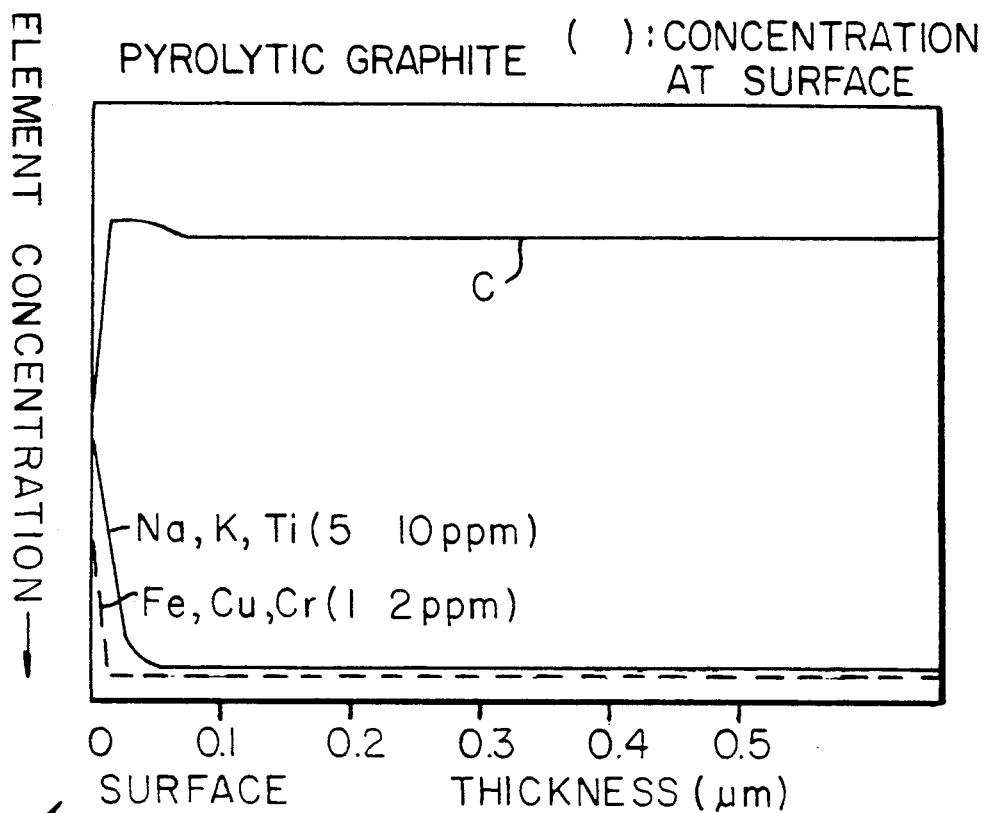
FIGS. 7 and 8 show impurity concentration profiles in a direction of a coating thickness, respectively, and FIG. 9 schematically shows a cross sectional view of the heating furnace which was used in Examples 5 and 6 which will be described below.
Figure 8:
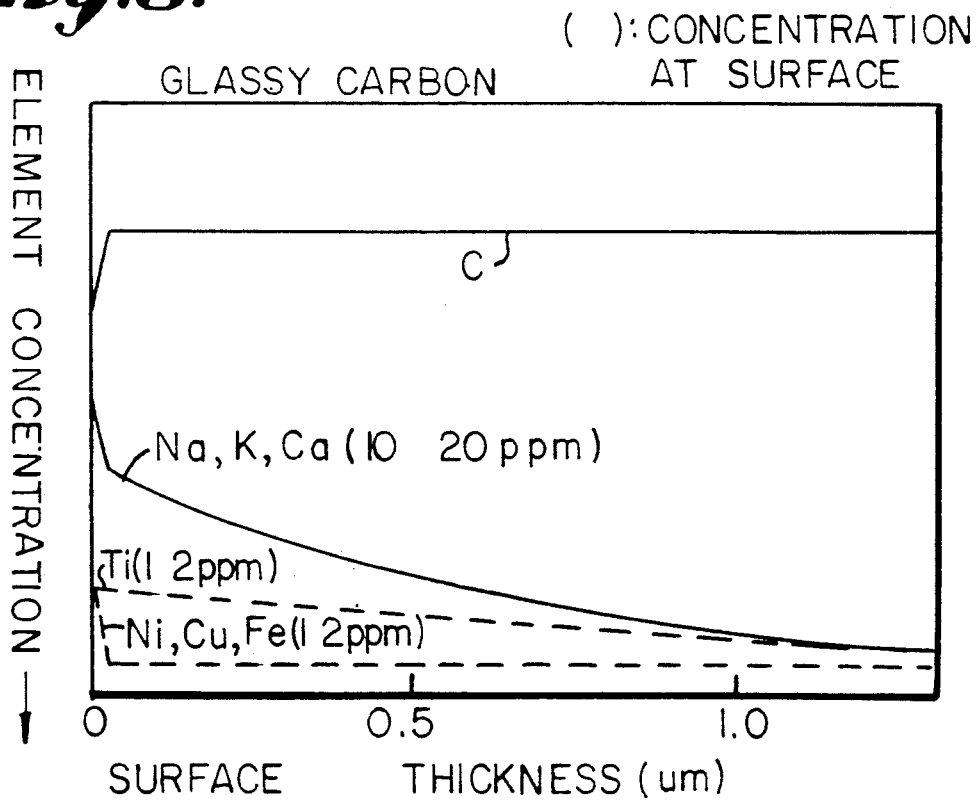

FIG. 7 shows the distributions of the element concentration in the pyrolytic graphite coating, and FIG. 8 shows those in the solid-phase carbonized glassy carbon coating. These graphs were obtained through measurements on the distributions of impurity concentration along the thickness direction of the coatings by the secondary ion mass spectrometry (SIMS). The vertical axis indicates the element concentration, and the horizontal axis does a thickness of the coating and left end of the horizontal axis corresponds to the surface of the coating. Though the element concentrations are qualitatively shown, the impurity element (e.g. an alkali metal or a transition metal) concentrations in the vitrified carbon coating are higher than those in the pyrolytic graphite coating, as can be seem from the surface concentrations indicated in the graphs and the curve profiles. The above results of this example are seemed to be induced from the above difference of the element concentrations.

However, even in the use of the muffle tube having the vitrified carbon coatings, the optical fibers fabricated from the sixth and subsequent preforms had low transmission loss of 0.17 dB/km. This is because the impurities in the coating were removed.

EXAMPLE 5

Figure 9:
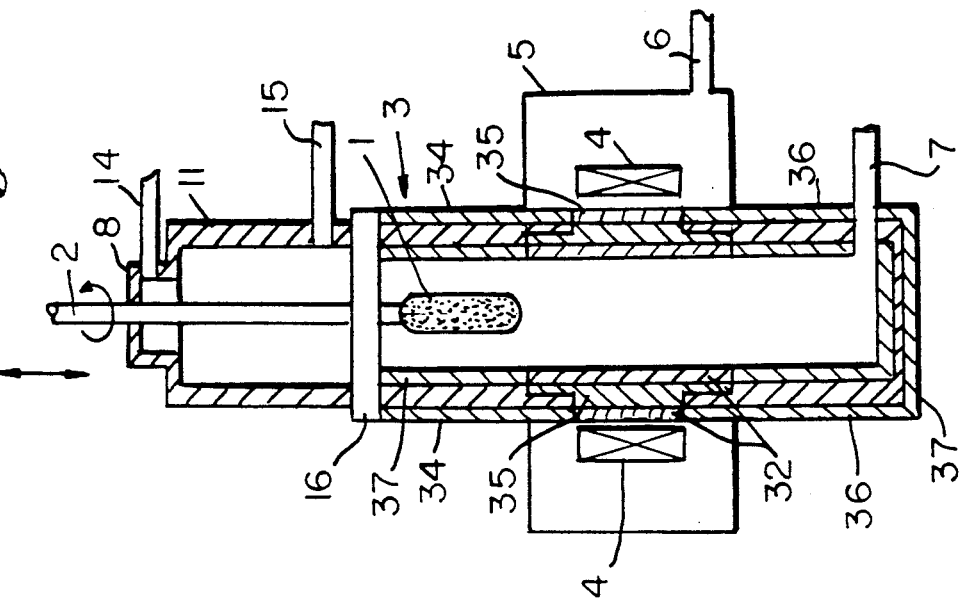

A heating furnace as shown in FIG. 9 was used in this example. In this heating furnace, a heater 4 was installed in a cylindrical furnace body 5 through which a muffle tube 3 passed. A preform which was inserted in the muffle tube was thermally treated with the heater 4.

In the heating furnace as shown in FIG. 9, the muffle tube 3 consisted of three parts (34, 35 and 36) and further a front chamber 11 in order to prevent the oxidation of the muffle tube. On the inner and the outer walls of the middle part 35 of the muffle tube, gas impermeable pyrolytic graphite coatings 32 were provided in a thickness of 30 to 40 $\mu$m. Since the upper part 34 and the lower part 36 were not heated to so high temperature, they were provided with SiC coatings 37 which were resistant to oxidation and the chlorine-containing gas and the fluorine-containing gas. The preform to be treated had a length of 500 mm and a diameter of 140 mm and had been produced by the VAD method.

The procedures with which the heating furnace shown in FIG. 9 was used were substantially the same as those in the use of the heating furnace as shown in FIG. 3. Firstly, the preform 1 was inserted in the front chamber 11 in which the partition 16 had been closed, and then the upper cover 8 was closed. Nitrogen gas was supplied at a rate of 10 l/min. from an inlet 15 to the front chamber for purging the interior space of the front chamber. Then, the partition 16 was opened and the porous preform was inserted in the muffle tube and thermally treated to produce the transparent preform. On removal of the preform, the preform is removed into the front chamber and then the partition 16 was closed followed by the removal of the preform after opening the upper cover.

Production of Core Part

After the preform was moved from the front chamber to the muffle tube, the preform was thermally treated with raising the muffle tube temperature to 1050° C. under an atmosphere of 20 l/min. of He and 200 cc/min. of SiC$_4$ at a lowering rate of 5 mm/min. so as to remove water contained in the preform and impurities. After the preform completely passed the heater, the SiCl$_4$ supply was terminated and only the He supply at 20 l/min. was continued and the muffle tube was heated to 1550° C. Then, the preform was pulled up at a rate of 4 mm/min. to vitrified the preform.

Production of Cladding Part

As in the production of the core part described above, a preform was dehydrated under an atmosphere of 200 cc/min. of SiCl$_4$ and 20 l/min. of He. Then, the muffle tube temperature was raised to 1200° C. and 900 cc/min. of CF$_4$ and 20 l/min. of He were supplied. The preform was pulled up at a rate of 3 mm/min. to be fluorine-added. Subsequently, the muffle tube temperature was raised to 1500° C. and the preform was lowered at a rate of 4 mm/min. in 20 l/min. of He supply so that the preform was vitrified.

The produced preform contained 1.3% by weight of fluorine and had a specific refractive index difference ($\Delta$n) of 0.35%.

Production of Optical Fiber

The pure quartz preform produced in the above production of the core part was stretched into a diameter of 5 mm in an electric resistance furnace.

A hole in a diameter of 5 mm was bored through the fluorine added glass preform produced in the above cladding part production, and dummy pipes were connected to both ends of the preform. The preform was placed in the electric furnace, and the inner surface of the preform was smoothed by SF$_6$ etching with keeping the inner surface at a high temperature. Then, the stretched pure quartz preform was inserted into the pipes and they were heated and integrated together under an atmosphere of Cl$_2$ to produce a preform for the optical fiber.

The produced preform was stretched into a diameter of 35 mm, and then a pure quartz core single mode optical fiber having a core diameter of 10.5 $\mu$m and a cladding diameter of 125 $\mu$m was drawn from the preform. The optical fiber had a low transmission loss of 0.18 dB/km at a wavelength of 1.55 $\mu$m.

EXAMPLE 6

A glass rod consisting of a center portion of quartz glass containing 6% by weight of GeO$_2$ and a periphery portion of pure quartz glass was produced by the VAD method. The diameter of the rod was 18 mm. A porous glass layer was further deposited on the glass rod. The rod had a diameter of 140 mm.

The preform produced as in the above was dehydrated and vitrified under the same conditions as in Example 5. Namely, the preform was placed in the front chamber and the interior space of the front chamber was purged with nitrogen gas. Then, the preform was moved into the muffle tube. The muffle tube temperature was 1050° C. and the preform was lowered through the muffle tube at a rate of 5 mm/min. under an atmosphere of 20 l/min. of He and 200 cc/min. of SiCl$_4$ so that the preform was dehydrated. After the preform passed the heater completely, the muffle tube temperature was raised to 1500° C. The SiCl$_4$ supply was terminated and the He supply at 20 l/min. was continued. The preform was pulled up at a rate of 4 mm/min. to vitrify the preform.

The vitrified preform had an outer diameter of 65 mm and a ratio of the outer diameter of the preform to the GeO$_2$ containing core portion was 15.0. An optical fiber having a diameter of 125 μm was drawn after the preform was stretched into a diameter of 35 mm.

The fabricated optical fiber had low transmission loses of 0.35 dB/km at a wavelength of 1.3 μm and 0.20 dB/km at a wavelength of 1.55 μm. The optical fiber had a sufficient initial tensile strength of 5.5 kg.

After 200 preforms were thermally treated, the inner wall of the muffle tube was inspected. The inner wall of the middle part of the muffle tube was slightly oxidized and no deformation and no deterioration was observed.

EFFECTS OF THE INVENTION

According to the present invention, the glass preform for the optical fiber which is not contaminated with the impurity such as iron or copper is produced with decreasing the wear of the muffle tube, and from the produced glass preform, the optical fiber having small transmission loss can be fabricated.

By providing the inner and outer walls of the muffle tube with the pyrolytic graphite coatings or the solid-phase carbonized glassy carbon coatings, the muffle tube is hardly worn by heat or the corrosive gases even at a high temperature so that it has good durability. Therefore, the muffle tube of the present invention is also economically advantageous.

Further, by making the muffle tube body from the highly pure carbon, the contamination of the porous preform with the impurity is prevented, the muffle tube does not react with the fluorine-containing gas (e.g. $CF_4$, $SF_6$, $SiF_4$ etc.), and the muffle tube is not broken at an extremely high temperature such as 1,800° C. or higher. Therefore, the durability of the muffle tube is further increased.

When the front chamber is provided to the heating furnace, the inflow of the air (atmosphere of the work room) into the heating atmosphere is prevented, and the contamination in the muffle tube with the impurities is prevented. Therefore, the devitrification of the preform is prevented and the transparency of the preform is increased. Since the temperature is not decreased during the insertion and removal of the preform, the operation rate of the furnace is high. When the muffle tube is made of the carbon coated with the pyrolytic graphite or the solid-phase carbonized glassy carbon, since the carbon is hardly oxidized, the life time of the muffle tube is increased, and graphite particles do not float in the muffle tube so that the ratio of the low strength part in the optical fiber fabricated from the glass preform is decreased.

When the carbon made muffle tube is used, the deformation due to heat and the devitrification and the subsequent breakage due to the crystallization which are encountered in the use of the quartz made muffle tube can be avoided, whereby the muffle tube can be used for a long period. When the quartz material is used, it is difficult to fabricate a muffle tube having a large diameter because of workability. However, when the carbon material is used as in the present invention, a muffle tube having a larger diameter than that of the quartz made muffle can be fabricated. Thus, it is advantageous that a preform having a larger diameter can be treated.

In the examples described above, though a zone furnace were used, the same effects as in the use of the zone furnace are obtained even in the use of a soaking furnace.

What is claimed is:

1. A method of thermally treating a glass preform for an optical fiber in a muffle tube to prevent corrosion by a fluorine-containing compound and a chlorine-containing compound, wherein a dehydrating agent comprising $SiCl_4$ is added, said dehydrating agent neither containing nor liberating oxygen, after which the preform is vitrified, and wherein the muffle tube is positioned inside a heater to separate a heating atmosphere inside the muffle tube from the heater, the muffle tube body consisting of highly pure carbon, and an inner wall and an outer wall of the body being coated with a carbon material selected from the group consisting of pyrolytic graphite and solid-phase carbonized glassy carbon, the carbon material being unreactive with $SiCl_4$.

2. A method for producing a glass preform for an optical fiber in a heating furnace comprising the steps of dehydrating a porous preform comprising fine particles of quartz base glass in an atmosphere comprising $SiCl_4$ as a dehydrating agent and said dehydrating agent neither contains nor liberates oxygen, and vitrifying the preform, wherein the heating furnace comprises a heater and a muffle tube positioned inside the heater to separate a heating atmosphere from the heater, the muffle tube body consisting of highly pure carbon, and an inner wall and an outer wall of the body being coated with a carbon material selected from the group consisting of pyrolytic graphite and solid-phase carbonized glassy carbon.

3. A method according to claim 2, wherein after the dehydrating step and before the vitrifying step, the method further comprises the step of adding fluorine to the preform in an atmosphere comprising $CF_4$ as a fluorine-adding agent.

4. A method according to claim 2, wherein the dehydrating and vitrifying steps are conducted simultaneously.

5. A method according to claim 3, wherein the adding and vitrifying steps are conducted simultaneously.

6. A method according to claim 1 wherein, after the dehydrating agent is added to the preform and before the preform is vitrified, fluorine is added to the preform in an atmosphere comprising $CF_4$ as a fluorine-adding agent.

* * * * *

UNITED STATES PATENT AND TRADEMARK OFFICE
CERTIFICATE OF CORRECTION

PATENT NO.   : 5,259,856

DATED        : November 9, 1993

INVENTOR(S)  : OHGA et al

It is certified that error appears in the above-identified patent and that said Letters Patent is hereby corrected as shown below:

ON THE TITLE PAGE: [54] should read:
[54]  METHOD FOR PRODUCING GLASS PREFORM IN FURNACE FOR HEATING GLASS Signed and Sealed this Eleventh Day of April, 1995

*Attest:*

BRUCE LEHMAN

*Attesting Officer*                    *Commissioner of Patents and Trademarks*

UNITED STATES PATENT AND TRADEMARK OFFICE
CERTIFICATE OF CORRECTION

PATENT NO. : 5,259,856
DATED : November 9, 1993
INVENTOR(S) : Ohga et al.

It is certified that error appears in the above-indentified patent and that said Letters Patent is hereby corrected as shown below:

Title page, item [73] should read:
Sumitomo Electric Industries, Ltd.
Osaka, Japan Signed and Sealed this Fourth Day of July, 1995

Attest:

BRUCE LEHMAN

*Attesting Officer*     *Commissioner of Patents and Trademarks*